United States Patent [19]

deVeer

[11] 4,320,502
[45] Mar. 16, 1982

[54] DISTRIBUTED PRIORITY RESOLUTION SYSTEM

[75] Inventor: John A. deVeer, Millbrook, N.Y.

[73] Assignee: International Business Machines Corp., Armonk, N.Y.

[21] Appl. No.: 879,987

[22] Filed: Feb. 22, 1978

[51] Int. Cl.³ .............................................. H04J 6/02
[52] U.S. Cl. ....................................... 370/85; 370/89; 370/94
[58] Field of Search .................. 364/900; 179/15 AL, 179/15 AS, 15 BW, 15 BA; 340/147 LP

[56] References Cited

U.S. PATENT DOCUMENTS

| | | | |
|---|---|---|---|
| 3,303,475 | 2/1967 | Hellerman | 179/15 BA |
| 3,425,037 | 1/1969 | Patterson | 364/900 |
| 3,466,397 | 9/1969 | Benowitz | 179/15 BA |
| 3,818,447 | 6/1974 | Craft | 340/147 LP |
| 3,969,703 | 7/1976 | Kwiatkowski | 364/900 |
| 4,035,780 | 7/1977 | Kristick | 364/900 |

*Primary Examiner*—David L. Stewart
*Attorney, Agent, or Firm*—Robert Lieber

[57] ABSTRACT

Multiple stations exchange information without central supervision. Stations requiring a cycle of access time on a shared time-divided bus participate in a cyclic access resolution process. The station having highest priority for a next bus cycle indicates its precedence to the other stations, and assumes exclusive use of the bus in the next cycle. The bus may comprise separate sections for data and response communications. Separate access resolution processes are conducted relative to each section. After gaining access to the bus for one cycle of data transfer a station becomes ineligible to compete for access to the data section until it receives an associated response. Accordingly receiving stations may control both the rate of data transmittal and the rate of access competition activity at associated origin stations. The data and response communications may include address information for enabling stations to intercommunicate directly in pairs. Data processing stations subject to multi-level interruption may present control signals designating acceptable interruption priority levels. Other stations seeking to interrupt such processing stations are eligible to compete for access to the bus only if assigned interruption priorities are at designated levels.

11 Claims, 11 Drawing Figures

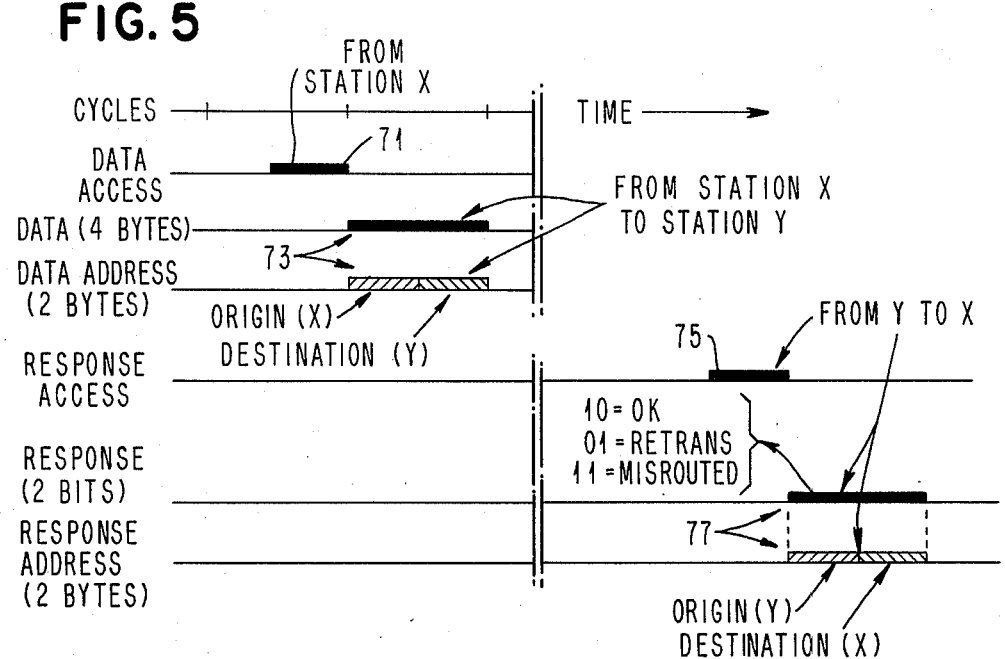
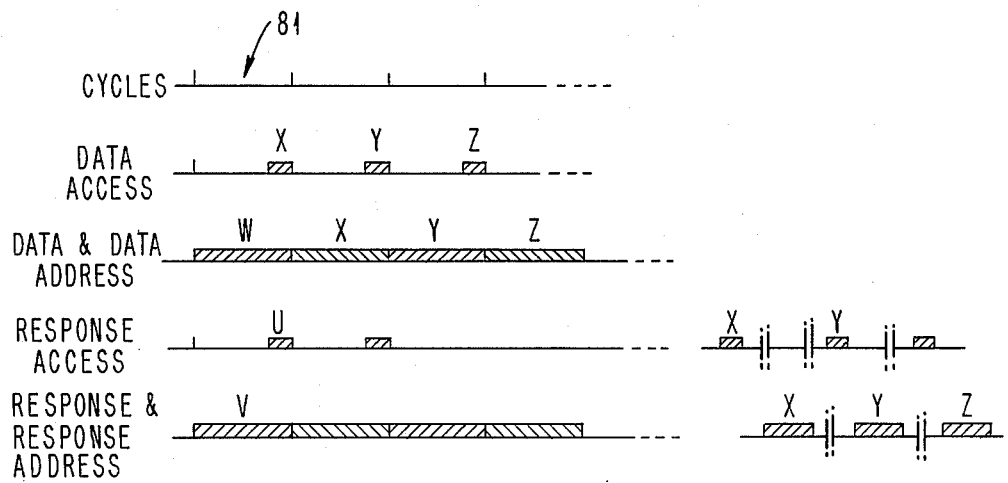

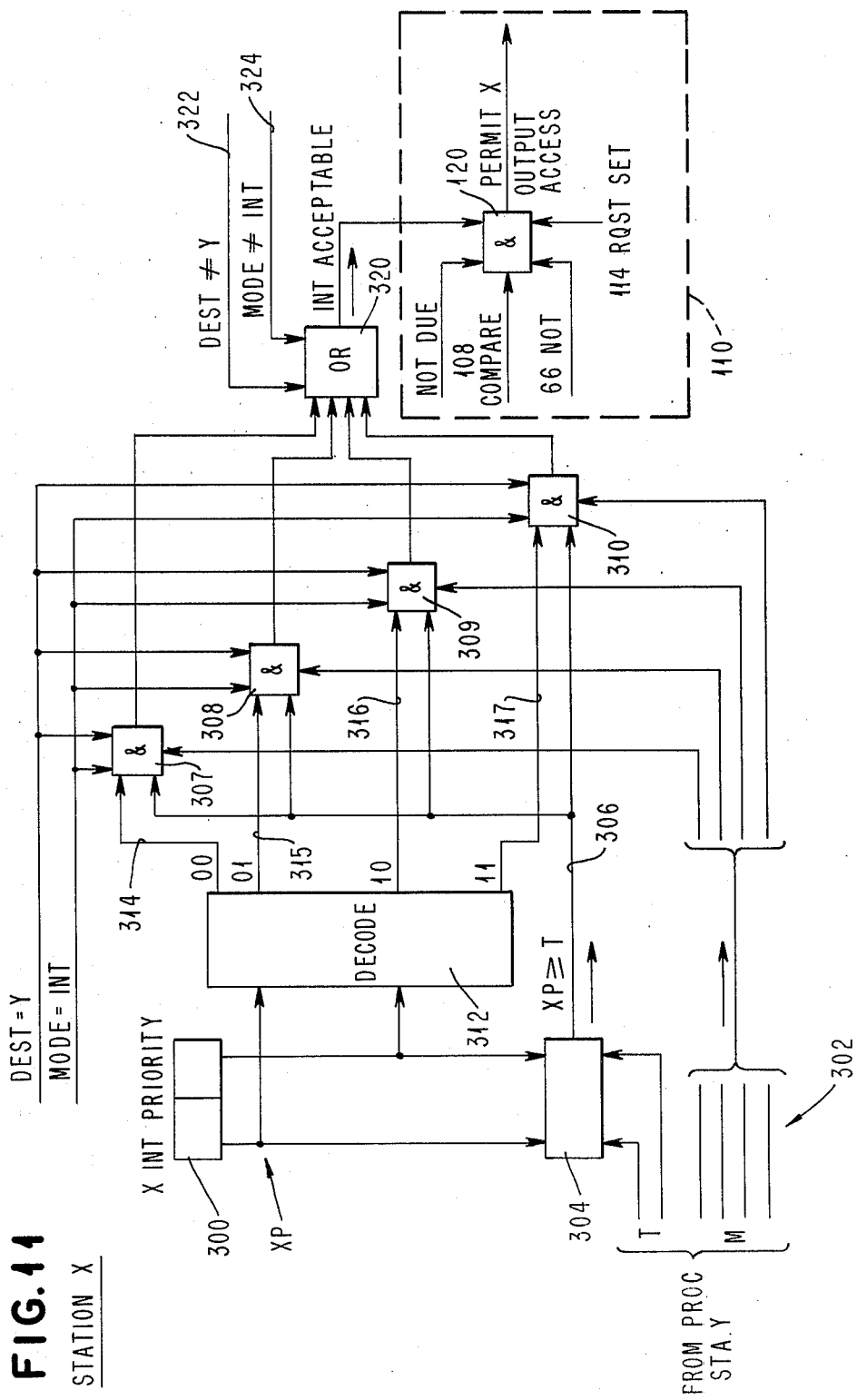
FIG.11 STATION X

DISTRIBUTED PRIORITY RESOLUTION SYSTEM

FIELD OF THE INVENTION

This invention relates to distributed data processing systems and data communication systems. In particular it relates to a method and apparatus for providing efficient distributed control of data communication functions in such systems.

THE PRIOR ART

Earlier time sharing systems have been characterized by delays which are generally attributable to the use of one station to control the time sharing allocation and data transfer functions. Such systems may also have critical dependence upon the operability of the central control station. The present invention seeks to avoid such delays and dependence.

Systems employing fixed station priorities to govern access to time shared facilities may have insufficient flexibility and adaptiveness for many data processing and data intercommunication applications. The present invention seeks to provide improved flexibility of application.

An objective in most access control systems is to avoid wasteful system blockages due to unnecessary communications. For instance, transmittal of data to an unprepared destination station is wasteful and unnecessary since the destination station must communicate improper reception and the data must be retransmitted. The present invention seeks to avoid such occurrences in a distributed access control environment.

SUMMARY OF THE INVENTION

The present invention seeks to avoid delays and dependencies characteristic of centrally controlled time sharing systems by: (1) distributing the access control function among the stations participating in the system; (2) adapting the participating stations to use the system in cyclic time segments; and (3) adapting the stations to resolve their access to any cycle time segment collectively on the basis of a synchronous access resolution process conducted during a previous segment.

The present invention seeks to provide an added measure of flexibility in this type of cyclic distributed access control system environment by having the station priorities assigned on a changeable basis.

The present invention seeks to avoid ineffectual use of the system by subdividing the cycle periods of bus usage into small time segments, in which small unit amounts of data may be transferred, and restricting the eligibility of stations to compete for access to such segments. In one form of such restriction each station gaining access to a segment becomes ineligible to compete for access until it receives a response to the associated data transfer.

In another form of such restriction a station seeking to transfer data in interruption mode to an interruptible data processing station becomes eligible to compete for access to the bus only when a pre-assigned interruption priority associated with the data is in a set of priority values pre-designated by the destination processing station. The processing station may be adapted to present interrupt mask and interrupt threshold signal functions in each cycle time segment for designating a set of interruption levels acceptable in the next segment. A station having interruption data to transfer to the processing station is eligible to compete for access to the bus for such transfers only if its assigned interruption priority level is in the set designated by these signal functions.

A feature of the present invention is that it enables multiple stations to use a common bus to exchange data without central or external supervision.

Another feature of the present invention is that it enables the stations to use the bus in cycle time segments and to resolve their access to the bus synchronously whereby access to a forthcoming cycle time segment may be resolved while a current time segment is being used on the basis of an earlier access resolution.

Another feature is that the stations are permitted to resolve their access to the bus in accordance with preassigned changeable priorities.

Another feature of the invention is that the stations may interact to restrict their eligibilities to compete for access, whereby a destination station may control the rate of access competition activity at an associated origin station as well as the rate of data transfer from that origin station.

A related feature is that an origin station having access to a current cycle time segment for data communication may be ineligible to compete for access to future time segments until it receives a response from an associated destination station.

Another feature is that associated data and response communications may be carried on separate time-divided buses.

Another feature is that an origin station seeking to communicate with a destination data processing station in an interruption mode may have eligibility to compete for bus access subject to restrictions imposed by interruption control signals presented by the processing station.

Another feature of the invention is that the data and response communications may be accompanied by address information designating origin and destination stations associated with each communication, so that stations may inter-communicate directly in pairs without having to operate through a central or intermediate station.

The foregoing and other objectives, features, aspects and advantages of the present invention may be more fully appreciated by considering the following detailed description and claims.

DETAILED DESCRIPTION OF THE DRAWINGS

FIG. 1 is a functional block diagram of a system of stations adaptive to use cyclic distributed access control relative to a shared bus in accordance with the present invention;

FIG. 2 schematically illustrates station logic for participating in a distributed access control operation in accordance with the present invention;

FIG. 5 illustrates time-staggered, pipelined and interlocked timing relationships of access control and data and response signaling functions performed relative to the bus elements shown in FIG. 4;

Figure 4:
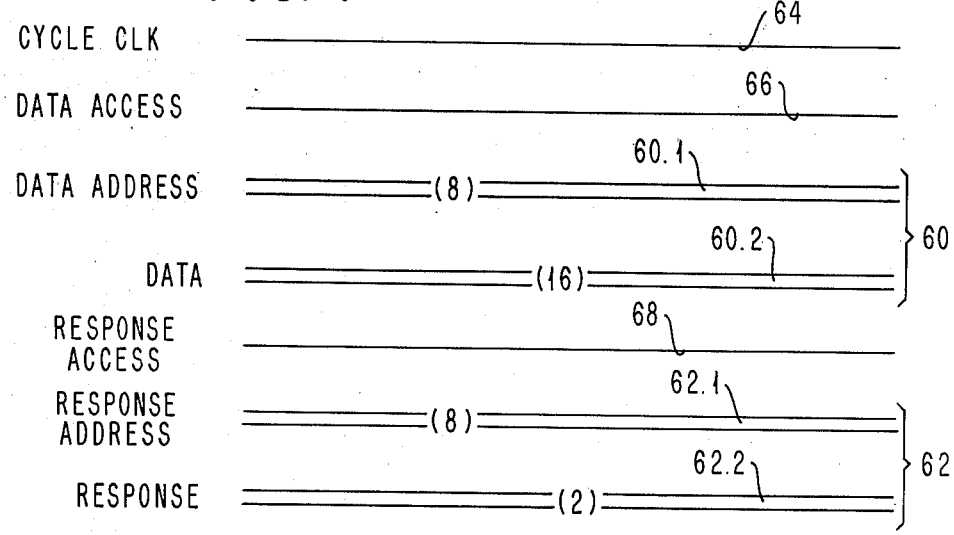
FIG. 4 illustrates a bus configuration useful for distributed control of interlocked data and response communications in accordance with one particular aspect of the present invention.
Figure 7:
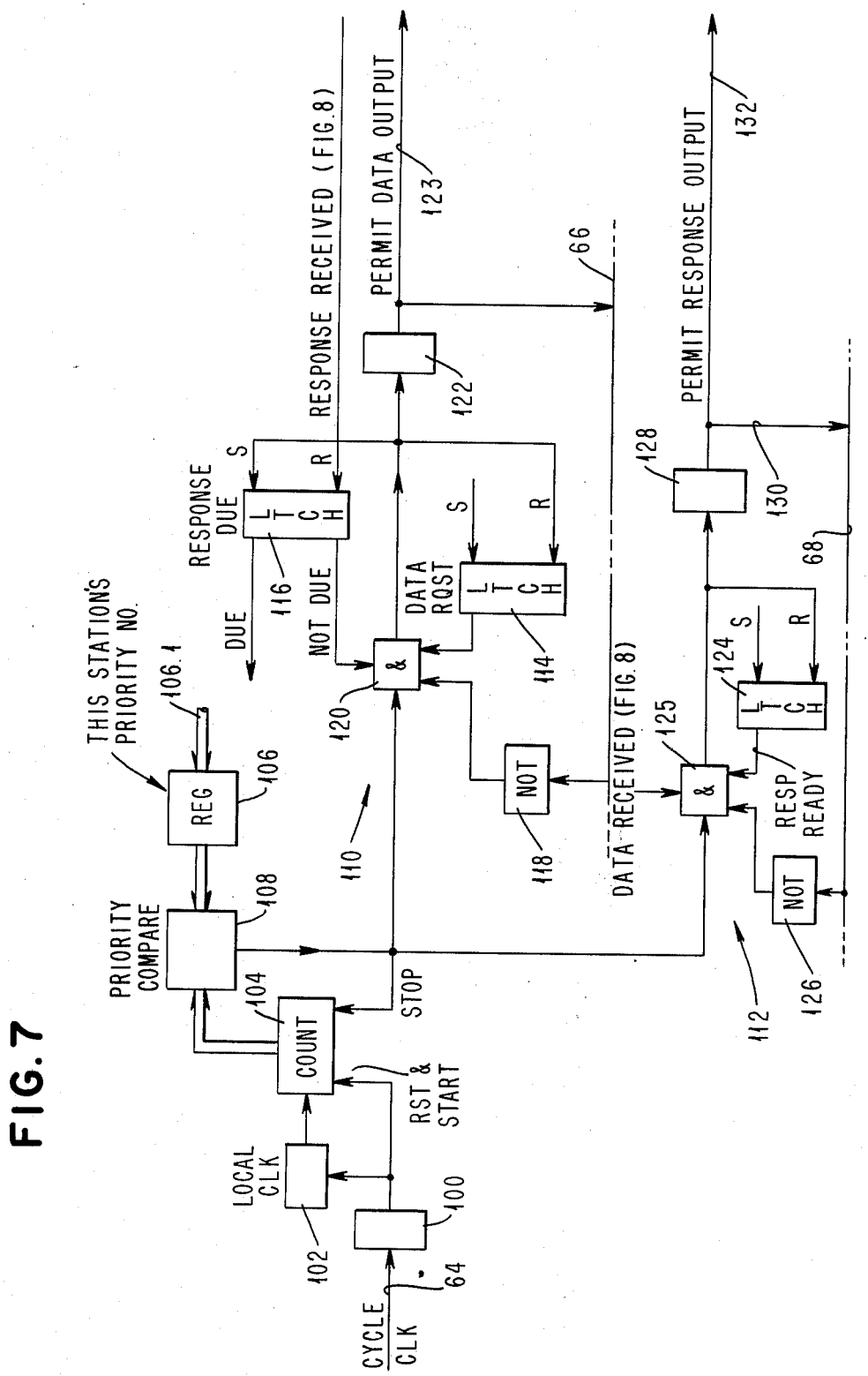
Figure 8:
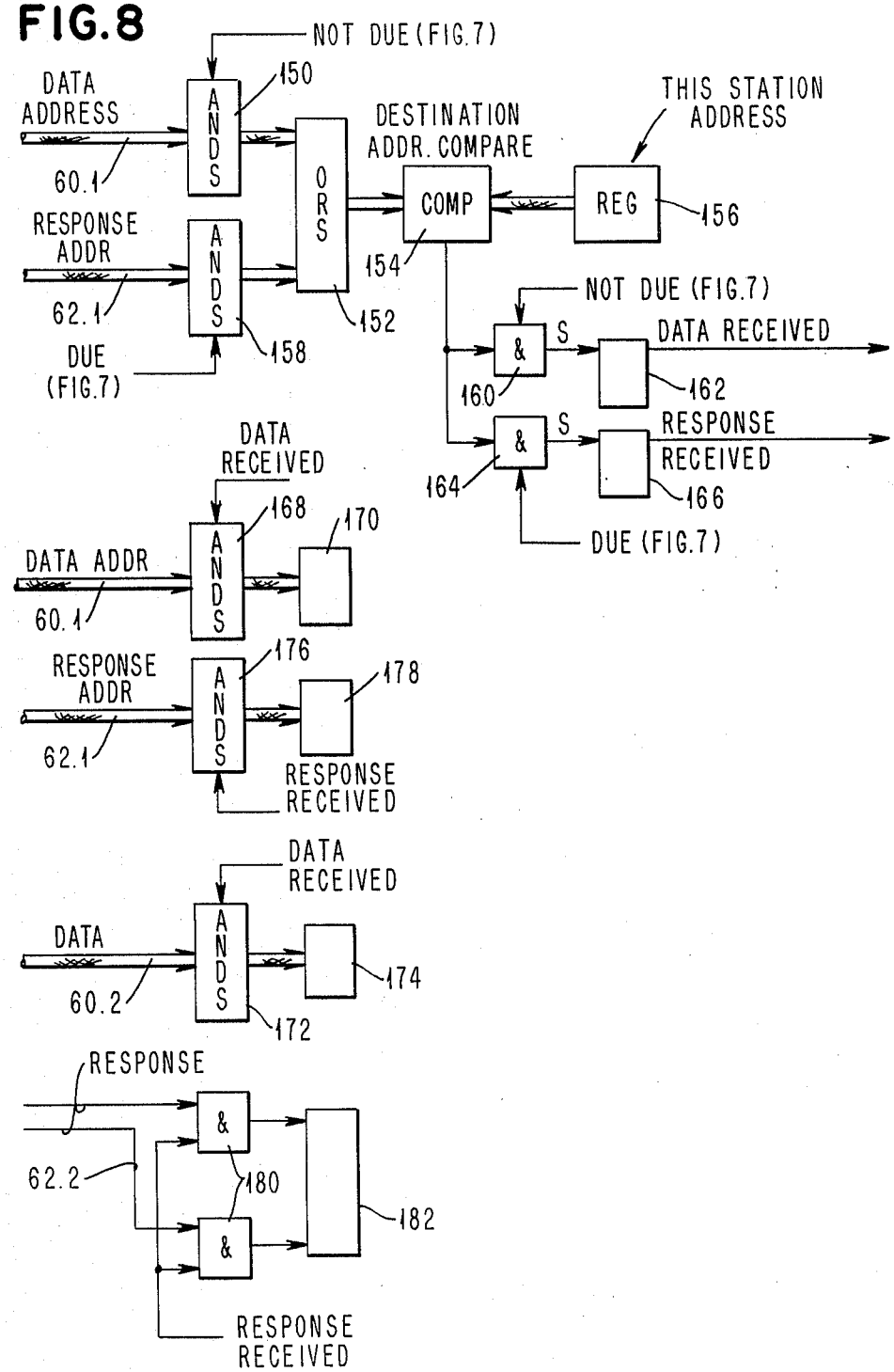
Figure 9:
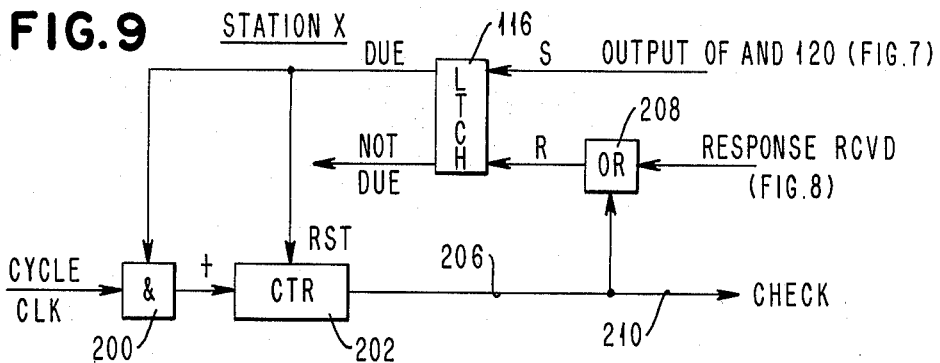
Figure 10:
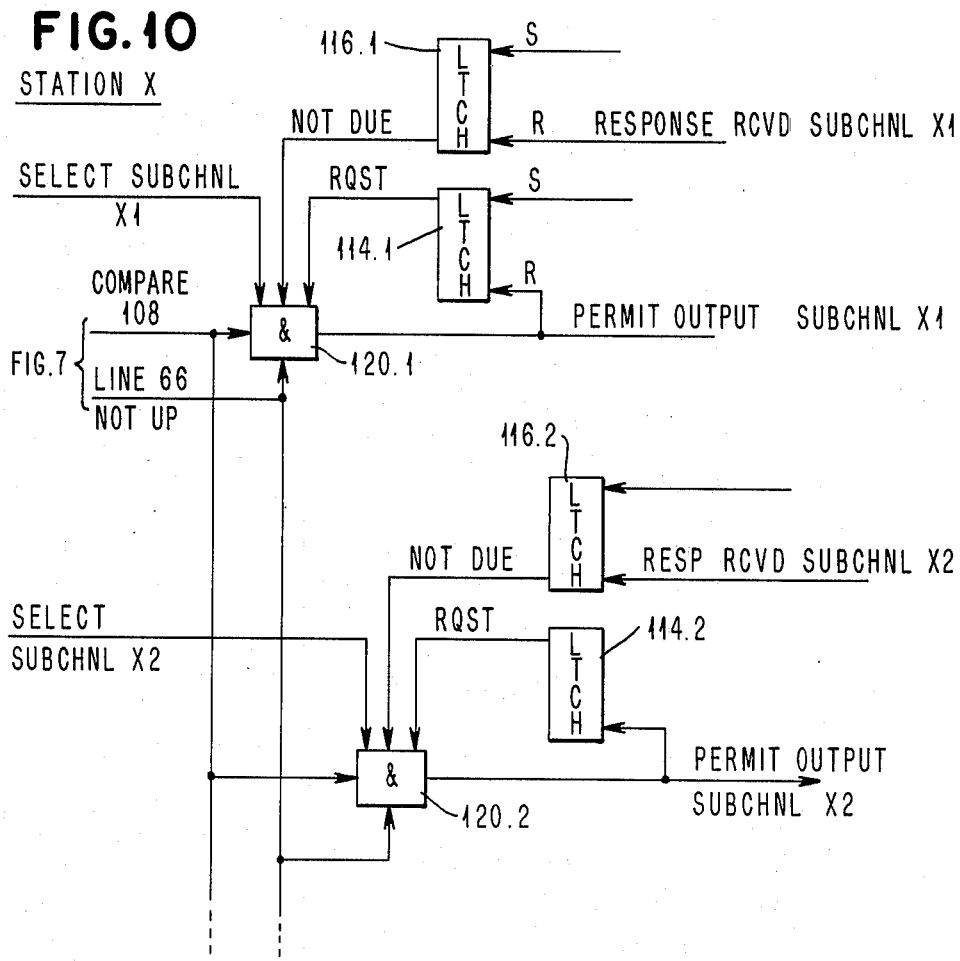

FIG. 6 further illustrates concurrency aspects of the timing relationships suggested in FIG. 5;

FIG. 7 shows logic at a typical station for controlling local output access to the bus elements shown in FIG. 4;

FIG. 8 shows station apparatus for receiving the data and response information functions characterized in FIGS. 5-7;

FIG. 9 shows how the access competition logic 110 in FIG. 7 may be adapted to recover automatically from a blockage caused by an overdue response;

FIG. 10 shows how access control logic 110 in accordance with FIG. 7 may be adapted to serve multiple subchannels of data output communication; and FIG. 11 illustrates control logic 110 in accordance with FIG. 7 adapted to restrict access relative to interrupt communications directed to a data processing station; interrupt threshold and mask signal functions presented by the data processing system being used at the subject station to control the access gating function relative to interruption data prepared for communication to the data processing station.

DETAILED DESCRIPTION

Figure 1:
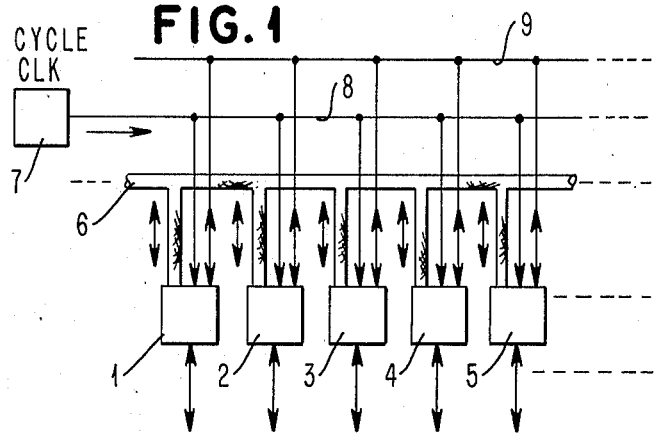

FIG. 1 shows a system for distributed access control in accordance with the present invention. Multiple data transceiving stations represented at 1 through 5 intercommunicate via a shared bus 6. The bus is continuously accessible for use in repetitive cycle time segments defined by clock signals distributed to the stations from a common source of clock oscillations 7 via a common clock distribution line 8.

While a current cycle time segment is being used to transfer information access to the next segment is resolved by distributive action at the stations. During the current time segment stations requiring access to the next segment conduct synchronous timeouts which terminate in accordance with unique pre-assigned access priorities. The station having highest access priority completes its timeout earliest, pulses control line 9 and assumes precedence for use of the next segment. The pulsing of control line 9 effectively blocks all other stations from assuming precedence.

The foregoing stations, bus, clock distribution line and access control line may be arranged either in one LSI circuit package or in a commonly housed group of LSI packages, or even in a dispersed network of separately housed stations subject to signal delay limitations discussed later.

Figure 2:
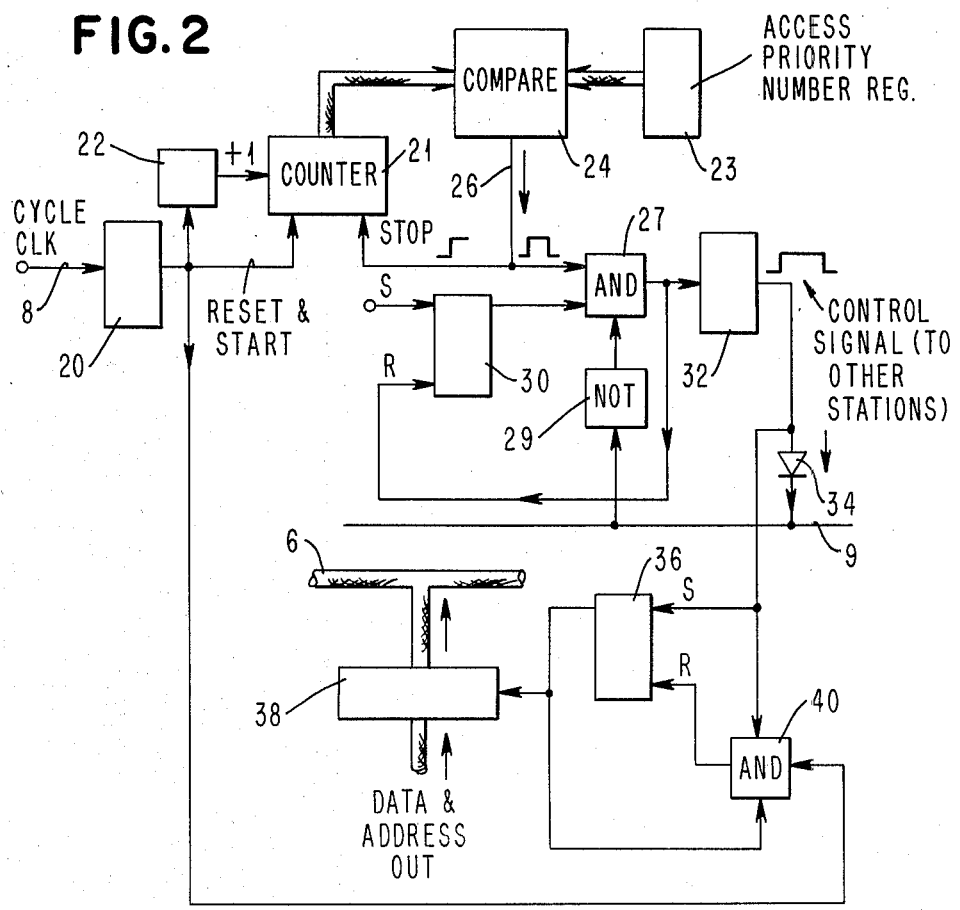

FIG. 2 shows station apparatus for participating in the foregoing distributed access resolution process. Cycle clock signals received via clock distribution line 8 operate single shot circuit 20 to produce cycle initiating pulses which are coincident with beginnings of cycle time segments of utilization of data bus 6. Each cycle initiating pulse resets local access timeout counter 21 and enables local timing source 22 to transfer count pulses to counter 21 at intervals which are short by comparison to the duration of a bus cycle time segment. The state of counter 21 is compared to a digital access priority number held in register 23 by digital compare circuit 24.

Each participating station is pre-assigned a unique access priority number in the counting range of counter 21. These numbers may be changed by communications through the bus. Consequently, at each station the assigned access priority number and local count will match at a unique point in time in each bus access cycle and stimulate compare circuit 24 to produce a pulse at its output 26 at that time. The pulse at 26 terminates the counting action at counter 21 and also conditions AND circuit 27 to respond to a signal presented by NOT (inverting) circuit 29, if a state signal presented by local "request state" latch 30 is permissive. Accordingly AND 27 will be operated by the output of comparator 24 only if a request for access is pending at this station (latch 30 in SET condition) and the instantaneous state of the access control line is "down" (output of NOT 29 "up"). Under these conditions the subject station has highest priority for access to the bus.

Operation of AND 27 resets latch 30 and stimulates single shot circuit 32 to produce a control pulse which remains active for the duration of the current cycle time segment. This pulse is transferred to the other stations via access control line 9 for disabling the counterparts of AND circuit 27 at the other stations and thereby resolving the precedence of the subject station. The trailing edge of this pulse is used to set access control latch 36 at the beginning of the next cycle time segment of bus usage. Isolation diode 34 prevents setting of latch 36 by control pulses originated at other stations. In set condition latch 36 enables data outgates 38 to permit data and address information to be transferred from the subject (prevailing) station to the bus 6 during the next cycle time segment. The address information preferably designates both the origin and destination station locations. In set condition latch 36 also partially enables AND circuit 40 and thereby permits a reset pulse to be transferred from pulse source 20 to latch 36 at the end of the same next cycle time segment.

Considering the foregoing operation, relative to the system of all participating stations, access timeout counters such as 21 and station comparison circuits such as 24 operate cyclically at all stations to provide respective matching indications at time instants determined uniquely by respective station access priority numbers manifested in registers such as 23. In stations requiring access to the bus (i.e., having respective latches such as 30 in set condition) logic represented by respective AND circuits such as 27 operates at respective comparison match times to determine if bus 6 is accessible (i.e., if the instantaneous state of the access control line 9 is permissive). The one station at which these conditions are first fulfilled assumes precedence for exclusive use of bus 6 in the next cycle time segment and signals this to the other stations by pulsing access control line 9 (thereby preventing the other stations from fulfilling the access precedence conditions in that cycle). The other stations remain eligible to compete for access in the next cycle (respective latches 30 remain in set conditions) and the foregoing access contention process is repeated in the next cycle while the station assuming precedence in the previous cycle is using the bus to transfer data.

The timing of the count transitions at counters 21 is determined by the number of participating stations, the duration of the basic cycle time segment and the signal delays between stations. There should be a unique matching count state for each station in the system and the interval between consecutive count steps should be longer than the worst case propagation delay of the access control signal function manifested on line 9 (to ensure that an access control signal initiated at any station will reach all other stations before the count at any lower priority station can be changed to a potentially matching value).

Figure 3:
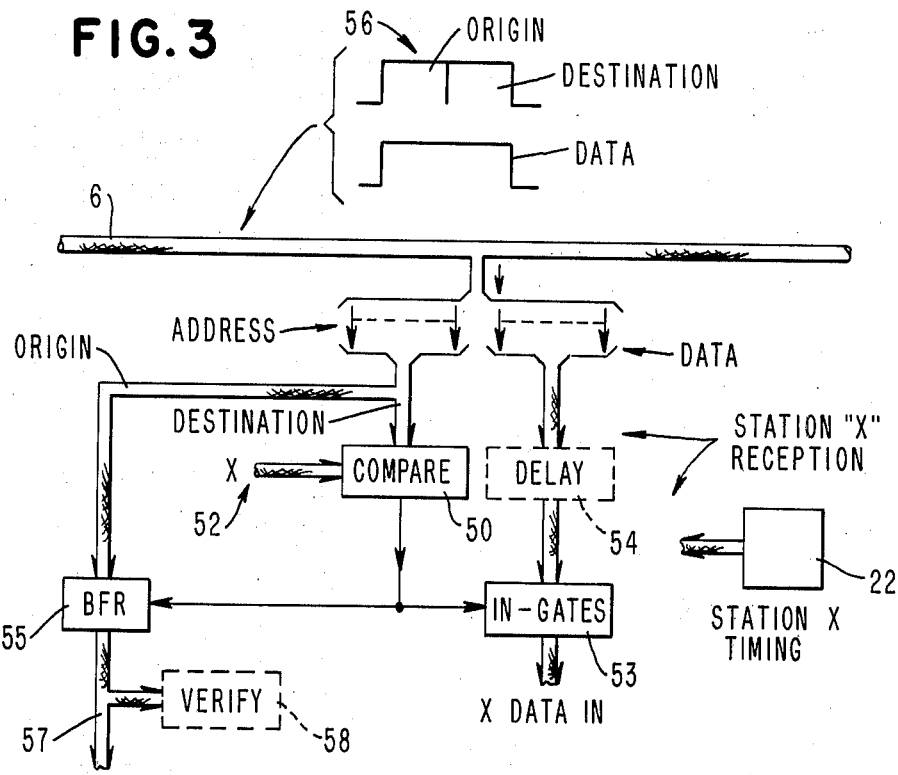
FIG. 3 illustrates station apparatus for receiving data transferred through the subject system.

Reception handling is suggested in FIG. 3. The information transferred on bus 6 comprises "data" and associated "address" information functions. The address information designates the destination and origin stations for the associated data. The destination address arrives first and is compared in circuits 50 at each station to local identity information 52 designating that station's address. If a match is detected the accompanying data is passed through ingates 53 for further reception handling at the respective station. If the data and destination address are transferred in parallel, as suggested in this figure, the data reception may be delayed at each station as suggested at 54 to allow time for the respective comparison circuit 50 to complete its operation.

If a destination match is detected circuits 50 prepare station buffer circuits 55 to save the origin address component of the incoming address information. This component may trail the destination address component as suggested at 56. The saved origin address is presented at 57 for use as the destination address of any responsive communication to the origin station. It is also verified in circuits suggested at 58 to ensure that the source and destination stations have an appropriate connection association in the system. Such connection associations may be pre-established relative to data-response communication sequences; either by information in the "first cycle" of data presented by the origin station or by "data" communications from a "supervisory" station.

In the foregoing system associated data and response communications are interlocked for obvious reasons. These communications could be accommodated on the same physical bus. But this would require stations to compete for access to the bus for both types of communication. This could produce an unacceptably high rate of access competition activity, which might be detrimental to low priority stations, and it could complicate the logic and procedure for interlocking.

By virtue of the above-mentioned interlocking a station gaining access precedence to originate a cycle of data transfer may be rendered ineligible to compete for access to another cycle segment until the associated response is returned. This would enable the destination stations to control the rate of access competition activity at associated data originating stations and thereby ensure that a high priority data originating station could not use multiple consecutive bus cycles to send data relative to an unprepared or pre-occupied or incorrectly designated station.

A system having potentially more effective interlocking of data and response communications is described next in reference to FIGS. 4 through 8. FIG. 4 shows a bus having separate data and response sections 60 and 62 which are used concurrently in cycle time segments defined by clock signals on cycle clock line 64. Data access control line 66 is used to resolve access to data bus section 60. Response access control line 68 is used to resolve access to response bus section 62.

Data bus section 60 comprises sub-sections 60.1 and 60.2 for conveying associated address and data information functions in parallel. Response section 62 is similarly composed of sub-sections 62.1 and 62.2 for respectively conveying associated address and response information functions in parallel. As before each address information function comprises sequentially transferred destination address and origin address components.

The illustrated data bus sub-section 60.2 comprises sixteen lines. In a typical application using a cycle time of 180 nanoseconds and a transfer rate on each data bus line of two data bits per cycle the bus would handle data at an aggregate rate of four bytes (thirty-two bits) per cycle and $2.23 \times 10^7$ bytes per second.

Each address sub-section 60.1 and 62.1 in this illustration consists of eight lines, each sub-section adapted to accommodate two bytes of address information per cycle; one byte to designate the destination of the information on the associated sub-section 60.2 and 62.2 and another to designate the origin of the associated information.

The response sub-section 62.2 may consist of either one or two lines (two are illustrated) adapted for conveyance of two bits of response information per cycle. These two bits can be used to manifest up to four response or acknowledgment states. The illustrated system would use three of these states: one to indicate correct transfer, another to indicate improper reception (need for retransmission) and a third to indicate incorrect designation of destination.

FIGS. 5 and 6 illustrate the timing of data transfer and response transfer functions relative to the bus configuration shown in FIG. 4. When any station (e.g., station "x") determines by means described later, that it has precedence for one forthcoming cycle of data transfer it presents a control indication on data access control line 66 (FIG. 4) in the form suggested at 71, and in the next cycle it forwards associated address and data information functions, on sub-sections 60.1 and 60.2 of data bus 60, in the form suggested at 73. The address information sequentially designates the destination (y) and origin (x) of the associated data information. The destination address is transferred first in order to enable the destination station to initiate early reception handling of the data, and thereby ease the amount of reception buffer storage capacity required at each station.

The destination station (y) receives the data and data address information and prepares an associated response. When the response is ready (after an indefinite number of cycles) this station posts a request for access to the response bus (62, FIG. 4), and when its precedence is established it (station y) raises the response access control line 68 in the manner suggested at 75. Then in the next cycle it returns the response address and response information functions to station x, on bus subsections 62.1 and 62.2, in the form suggested at 77. The response address comprises a destination designation (x) followed by an origin designation (y).

FIG. 6 is intended primarily to indicate that while any station x is acquiring precedence for use of the data bus, in the cycle designated 81, the data bus may be simultaneously occupied by data from another station (w) and the response access control line and response bus may be simultaneously occupied by signal activities of other stations (u and v).

FIG. 7 shows the logical organization at a typical station for resolving local access to the foregoing bus configuration. Cycle clock pulses received from bus line element 64 operate pulse producing circuit 100 to provide cycle initiating pulses to local count timing source 102 and local counter 104. Counter 104 is incremented by the output of source 102 and the count state is compared to the local access priority number manifested in register 106 by digital compare circuit 108. When a match is detected incrementing of counter 104 is suspended for the rest of this cycle and logical circuits 110 and 112 are prepared for further operations. External access to register 106 (for modifying the priority) is suggested at 106.1.

Logical circuit 110 operates relative to access control line 66 (FIG. 4) to resolve access precedence relative to data bus section 60 (FIG. 4). Logical circuit 112 operates relative to access control line 68 (FIG. 4) to resolve access precedence relative to the response bus section 62 (FIG. 4).

In logical circuit 110 "data request" latch 114 is set when the subject typical station has data to transfer to bus section 60 and reset when access precedence is established at this station. "Response due" latch 116 is set when the subject typical station has assumed precedence for a cycle of data transfer and reset when the associated response from the destination station has been received. NOT circuit 118 manifests the complement of the state of access control line 66. AND circuit 120 is controlled by the "set" output of latch 114, the reset output of latch 116 and the output of NOT circuit 118. Consequently the comparison match indication produced by compare circuit 108 will be passed through AND 120, as indication of local precedence, if and only if the subject station: has data ready for transmittal (latch 114 set), is not awaiting a response to a previous cycle of data transmittal (latch 116 reset), and has priority relative to all competing stations (i.e., relative to all stations instantaneously having the first two conditions satisfied) as indicated by the instantaneous state of NOT circuit 118.

Activation of AND circuit 120 completes the conditions at the subject station for assuming precedence for transfer of data to bus section 60 in the next cycle and for signaling such precedence to the other stations via control line 66 for the remainder of the current cycle. Upon such activation latch 114 is reset, latch 116 is set and pulse producing circuit 122 is stimulated to provide a pulse indicating assumption of precedence for the remainder of the current cycle. The pulse produced by circuit 122 is transferred to the other stations via access control line 66. It is also used as suggested at 123 to prepare not-shown circuits for the outgating of data and data address information to bus elements 60 in the next cycle. The pulse transferred on line 66 effectively serves to prevent any lower priority station from assuming precedence for data transfer in the next cycle.

A similar operation is performed relative to logical circuit 112, access control line 68 and bus elements 62. In logical circuit 112 "response ready" latch 124 is set when this station has a response ready for transmittal relative to an earlier received data communication, and it is reset when precedence is assumed at this station relative to control line 68 for use of response bus elements 62 to forward the response in the next cycle. In set condition latch 124 partially enables AND circuit 125. Other inputs to AND circuit 125 include the output of comparator 108, a "data received" function representing the output of a data received latch discussed below in reference to FIG. 8, and the output of NOT circuit 126 representing the complement of the state of response access control line 68. Consequently AND circuit 125 will be conditioned to pass the comparison match output of comparator 108 if and only if the subject station has: a response ready to be forwarded relative to a previously received cycle of data communication and the subject station has instantaneous priority for use of the response bus elements in the next cycle.

Activation of the output of AND circuit 125 resets latch 124 and stimulates pulse producing circuit 128 to produce a pulse which terminates at the end of the current access resolution cycle. This pulse is transferred to the other stations via line 130 and response access control line 68 (to indicate instantaneous response access precedence in the subject station) and presented to not-shown response outgating circuits via line 132 for preparing the execution of the response transfer relative to bus elements 62 in the next cycle.

FIG. 8 illustrates the logic of data and response reception at a typical station. In each cycle in which a response is not due the destination component of the data address (refer to FIG. 5) is passed from bus elements 60.1, through AND gates 150 and OR circuits (or junctures) 152, to digital comparator circuit 154 for comparison to the subject station's assigned address as manifested in register 156. In each cycle in which a response is due the destination component of the response address signal (refer again to FIG. 5) is passed from bus elements 62.1 through AND gates 158 and OR junctures 152 for comparison with the subject station's address in comparator 154. Such dual usage of comparator 154 for detection of the destination components of the data address and response address functions is obviously predicated on the feasibility of treating these functions in a time exclusive manner at each station. In any system in which such treatment might be unfeasible separate comparators may be used. In general however, the principal potential conflicts arising from such shared usage may be dealt with more simply in a manner described later in the discussion of FIG. 9.

In each cycle in which a response (to an earlier data communication orginated by this station) is not due, and in which a match is detected by comparator 154, AND circuit 160 is stimulated to set latch 162 and thereby provide "data received" conditioning to AND circuit 125 (FIG. 7). In each cycle in which a response is due, and in which a match is detected by comparator 154, AND circuit 164 is stimulated to set latch 166 and thereby "response received" reset conditioning to latch 116 (FIG. 7).

In each cycle in which a "data received" condition is manifested by latch 162 AND circuits 168 are operated as parallel gates to pass the "trailing" origin component of the address arriving on bus elements 60.1 to undetailed logical circuits 170 which operate to: preserve the origin address information (in a buffer register or store), verify appropriate orgin-destination association between the preserved address and this station's address, and use the preserved address to form the destination address component of an associated response which will be prepared relative to the data arriving on bus elements 60.2. In the same cycle AND circuits 172 are operated as parallel gates to pass the incoming associated data from bus elements 60.2 to undetailed processing circuits 174 which operate to: preserve (buffer) the data, verify its correct reception if appropriate, reset latch 162 at or prior to the end of the current cycle, prepare an associated response in cooperation with circuits 170, set latch 124 (FIG. 7) when such response is available for transmittal to the origin station manifested in circuits 170, and provide further handling of the data in accordance with its information context. Details of the processing functions performed by circuits 170 and 174 are considered not relevant to the subject invention and are therefore omitted so as to avoid potentially obscuring this description.

In each cycle in which a "response received" condition is manifested by the setting of latch 166 AND circuits 176 operate as parallel gates to pass the origin address signals from bus elements 62.1 to processing circuits 178 which operate to: verify appropriate origindestination association for this response, reset latch 166 at or prior to the end of this cycle and prepare for the further transmittal or retransmittal of data as warranted by the information context of the associated response intelligence. The associated response intelligence (two bits), manifested on bus elements 62.2 during the cycle in which "response received" is effective, is passed through the two AND circuits 180 for storage and interpretation by processing circuits 182. If the response indicates proper reception of the associated data, at the "destination" station originating this response, circuits 178 are primed by circuits 182 to permit this station to transfer new ("fresh") data when it next gains access to bus elements 60. If the response indicates improper reception or misrouting of an earlier data communication circuits 178 are primed to prepare the previously transmitted data for retransmittal, with revised destination routing if appropriate, when access to bus elements 60 is next acquired. Details of circuits 178 and 182 are omitted as being obvious in respect to the connections required to reset latch 166 and nonrelevant to the present invention in respect to the other functions indicated above.

FIG. 9 shows how the logic 110 in FIG. 7, for resolving local access to data bus elements 60, may be adapted to recover from a local data output blockage due to an overdue response to an earlier data communication. When latch 116 is set (refer to FIG. 7) the "not due" input to AND circuit 120 (FIG. 7) becomes disabling and prevents the respective station from gaining access to the bus 60. As shown in FIG. 9 the "due" output of latch 116 may be used to gate cycle clock pulses (or other "slow" timing signals) through AND circuit 200 to the incrementing input of the timeout counter 202. This counter is reset by the leading edge transition of the "due" signal and its count is increased progressively from the reset value until the "due" signal terminates. If the timeout counter reaches a predetermined value associated with faulty communication "response overdue" rises at 206 and is passed through OR circuit 208 as an over-riding reset input to latch 116. This effectively terminates the "due" signal and "unblocks" the access control "gate" 120 (FIG. 7). As suggested at 210 the overdue indication may also be presented to not-shown station diagnostic circuits as a "check" indication representative of faulty communication.

FIG. 10 shows how "station x" logic 110 in FIG. 7 may be adapted to serve plural data output subchannels X1, X2 . . . . Each output subchannel Xn (n=1,2, . . . ) has an individual request latch 114.n (corresponding to latch 114, FIG. 7), an individual "response due" status latch 116.n (corresponding to latch 116 FIG. 7) and an individual access AND gate 120.n (corresponding to AND 120 FIG. 7). The gates 120.n are conditioned jointly by the outputs of compare 108 (FIG. 7) and NOT 118 (FIG. 7), and individually by the output states of respective latches 114.n and 116.n, so that data output relative to a respective subchannel is permitted when the subchannel is active and not awaiting a response and station x has priority relative to the other stations.

FIG. 11 in conjunction with FIG. 7 illustrates restriction of access competition at a station x relative to interruption mode communications directed to a processing station y which is capable of receiving communications in an interruption mode and in "normal" mode. In interruption mode the program at station y is interrupted whereas in "normal" mode it is not. It is assumed furthermore that station y can accommodate multiple priority levels of interruption, that communications from station y to x are unambiguously distinguishable as either control commands for station x or other information to be handled by station x, and that communications from station x to station y are distinguishable as either interruption mode or normal mode communications.

The instantaneous priority XP of station x, for interruption mode communications with station y, is manifested in register 300. For simplicity, this priority is shown as a two-bit digitally encoded number although obviously more bits could be used. The value of XP is pre-established by control command communications from station y and may be different from this station's bus access priority as manifested in register 106, FIG. 7.

Station y also provides digital control functions T and M as shown at 302. T represents a (two-bit) threshold parameter relative to the range of values manifestable in register 300 and M represents a (four-bit) mask function with each bit arbitrarily on or off as determined by station y. When X has information to communicate logical subtraction circuits 304 compare XP to T and produce an enabling signal at 306 if XP is equal to or greater than T. The signal at 306 partially enables the four AND circuits 307–310. XP is also applied to logical decoding circuits 312 having four mutually exclusive outputs 314–317 connected individually as inputs to respective ones of the AND circuits 307–310. The bits of mask M are also connected individually to respective ones of the AND circuits 307–310. The AND circuits 307–310 are further jointly conditioned by signal functions "destination=Y" and "mode=interrupt" as shown.

When station x has data to send (set state of data request latch 114 FIG. 7), and the destination address denotes Y, "destination=Y" becomes enabling. If this data is to be presented in interruption mode "mode=interrupt" is enabling. If these conditions are fulfilled and XP is equal to or greater than T (306 enabling) one of the AND circuits 307–310 associated with the active one of the lines 314–317 will be operated to pass an output pulse to OR circuit 320, if and only if that line is in positional correspondence with an active one of the M lines. When one of these AND circuits is operated the "interrupt acceptable" output of OR circuit 320 thereby becomes enabling relative to the access control gate 120 in the access control logic 110 (which is identical to the logical configuration 110 shown in FIG. 7 except for the additional input represented by "interrupt acceptable").

Consequently if the conditions jointly applicable to all of the AND's 307–310 are coincidentally satisfied, and if the associated bit in mask M is permissive relative to the singular "X priority" output of decoder 312, the access gate 120 will be permitted to operate relative to the access control line 66 (FIG. 7) and afford bus access to station x when the previously discussed access priority comparison match occurs and station x has highest instantaneous bus access priority. If the appropriate bit in mask M is not permissive under these joint conditions, or if XP is less than threshold T, the output of OR 320 will remain disabling relative to AND 120 and station x will be effectively blocked from bus access.

If the destination is other than Y input 322 to OR 320 is enabling. If the destination is Y but the intended mode of communication is other than by interruption input 324 is enabling. Consequently in either of these two circumstances gate 120 will operate independent of the parameters XP, T and M (i.e., exactly as in FIG. 7).

While the invention has been particularly described with reference to preferred embodiments and particular aspects thereof, those skilled in the art will recognize that various changes in form and details may be made therein without departing from the spirit and scope of the invention as indicated in the following claims.

Having thus described my invention, what I claim as new, and desire to secure by Letters Patent is:

1. In an information handling system, in which information is transferred between multiple stations (1–5) via a time-shared bus (6), a distributed access control system for enabling said stations to self-determine their access to said bus on a competitive basis, said access control system comprising:
   means (7, 8) for defining cyclically repetitive time periods in which said bus is continuously available to transfer information between said stations;
   means (23) at each station for manifesting a unique relative priority of the respective station for gaining access to said bus to transfer information to another station;
   means (20–22, 24, 26, 27, 30, 32, 36) at each station, responsive to said time period defining means and the respective priority manifestation, for operating in isochronal relation to the other stations to effectively allocate the bus in advance of each of said time periods to the highest priority station instantaneously requiring access to said bus.

2. A distributed access control system in accordance with claim 1 including means (9,29) enabling the station acquiring access to the bus for any time period to inhibitively condition the effective allocation means at the other stations in advance of the respective period whereby each time period is allotted exclusively to one station.

3. A distributed access control system in accordance with claim 2 wherein said effective allocation means at each of said stations includes means operable while said bus is carrying information associated with an earlier allocation for determining the allocation of said bus for a predetermined later period.

4. A distributed access control system in accordance with claim 2, wherein said means at each station for manifesting a respective priority comprises a register, and means for applying signals to said register from a source external to be respective station, said system being thereby characterized in that the relative access priorities of said stations are susceptible of being modified by information communicated between the stations.

5. An access control system in accordance with claim 2 wherein each said station means for effectively allocating the bus in each time period comprises:
   first means (110) for allocating the bus in respect to transfers of data information functions;
   second means (112) for allocating the bus in respect to transfers of response information functions associated with data functions received from said other stations; and
   third means (116, 166) at each station for interlocking the operations of the data allocating means at the respective station with the reception of response functions from other stations receiving said data functions;
   whereby the stations receiving said data functions are capable of controlling the rate of competition activity, in respect to allocation of said bus, at stations originating transfers of respective data functions.

6. An access control system in accordance with claim 5 wherein: the bus comprises a data transfer section (60) and a separately accessible response transfer section (62); said means for allocating in respect to data functions operates exclusively relative to said data transfer section; and said means for allocating in respect to response functions operates exclusively relative to said response transfer section; and
   said access control system is characterized thereby in that the data and response sections of said bus may be occupied concurrently by data and response functions originated by different stations.

7. An access control system in accordance with claim 5 including timeout means (200, 202) at each station for over-riding the operation of said interlocking means after a predetermined time has elapsed following a data transfer in respect to which an associated response is due, said elapsed time being of sufficient duration to indicate a faulty communication in respect to said data transfer.

8. An access control system in accordance with claim 5 including means (60.1, 60.2) enabling said stations to transfer origin address and destination address functions on said bus in each period of information transfer whereby stations receiving transferred data can distinguish its intended destination and each designated destination station can direct a response uniquely to the station originating the respective data.

9. An access control system in accordance with claim 1 in which at least one of said stations is a data processing system susceptible of interruption at multiple priority levels of interruption, said access control system including means for transferring interrupt control signals (302) from said processing system station to other said stations, and means at said other stations responsive to said interrupt control signals for controlling the operations of said means to effectively allocate the bus at respective other stations, whereby information to be communicated from a respective other station to said processing system station, for handling by means of an interruption, is subject to communication only when said processing system station is subject to interruption at the priority level currently assigned to the respective other station.

10. In a distributed selection system, wherein multiple devices (1–5) share a connection facility (6) and self-control their access to said facility in a sequence order based on relative priority and relative access requirements, in combination:
   means (9) linking said devices for exchange of access control signals;
   timing means (7, 8) coupled to said devices for defining repetitive time periods of continuous accessibility of said facility;
   multiple means (21, 24, 27) associated with individual said devices for reacting to signals presented by other devices through said control signal exchange means for determining eligibility of the respective device to gain exclusive access to said facility in a predetermined future one of said time periods; and
   multiple means (36, 38, 40) associated with individual said devices for conditionally reacting to the respective eligibility determining means and connecting the respective device to said facility in said one of said future periods.

11. In an information handling system a method of effecting distributed control of access to a bus time-shared by multiple stations comprising:

defining cyclically repetitive isochronal time periods of continuous accessibility of said bus for handling discrete transfers of information between said stations;

manifesting said time periods at said stations;

pre-assigning relatively unique access priorities to said stations;

determining in each of said stations in each period if the respective station requires access to said bus in a following period;

at each station requiring access to said bus uniquely determining in each period the accessibility of the bus in a following period in accordance with the respective pre-assigned priority whereby the requiring station having highest pre-assigned priority relative to each following time period secures exclusive access to the bus in that following period;

transferring data and response units of information between specifically designated said stations in periods determined earlier in said accessibility determining steps; and requiring each station transferring data in any period to await reception of an associated unit of response information from another station before participating in another accessibility determining operation.

* * * * *